US012699353B2

(12) United States Patent
DeLacy et al.

(10) Patent No.: US 12,699,353 B2
(45) Date of Patent: Aug. 4, 2026

(54) TAGGING AND AUTHENTICATION OF ARTICLES USING A HOLOGRAPHIC INTERFERENCE PATTERN

(71) Applicant: Ballydel Technologies, Inc., Wilmington, DE (US)

(72) Inventors: Brendan G. DeLacy, Wilmington, DE (US); Mark S. Mirotznik, Wilmington, DE (US); Benjamin S. Garrett, Wilmington, DE (US)

(73) Assignee: Ballydel Technologies, Inc., Wilmington, DE (US)

( * ) Notice: Subject to any disclaimer, the term of this patent is extended or adjusted under 35 U.S.C. 154(b) by 381 days.

(21) Appl. No.: 18/498,749

(22) Filed: Oct. 31, 2023

(65) Prior Publication Data

US 2024/0061375 A1     Feb. 22, 2024

Related U.S. Application Data

(63) Continuation-in-part of application No. 18/176,269, filed on Feb. 28, 2023.

(60) Provisional application No. 63/314,533, filed on Feb. 28, 2022.

(51) Int. Cl.
   *G03H 1/00*          (2006.01)
(52) U.S. Cl.
   CPC .................................. *G03H 1/0011* (2013.01)

(58) Field of Classification Search
   CPC ... G03H 2001/2247; G03H 2001/0016; G03H 2210/53; G03H 2222/46
   See application file for complete search history.

(56) References Cited

U.S. PATENT DOCUMENTS

| | | | |
|---|---|---|---|
| 10,089,478 B1 | 10/2018 | Fraser et al. | |
| 2008/0241952 A1* | 10/2008 | Millington | G03H 1/18 |
| | | | 436/164 |
| 2012/0224263 A1* | 9/2012 | Gallagher | G02B 5/1861 |
| | | | 359/570 |
| 2014/0139608 A1* | 5/2014 | Rosario | B23K 26/359 |
| | | | 347/225 |
| 2017/0370838 A1* | 12/2017 | Ashrafi | G01R 33/3692 |
| 2020/0233377 A1 | 7/2020 | Weston et al. | |

* cited by examiner

*Primary Examiner* — Paul C Lee
(74) *Attorney, Agent, or Firm* — Kim and Lahey Law Firm, LLC; Douglas W. Kim

(57)          ABSTRACT
A computerized system for uniquely tagging and verifying authenticity of an article comprising: an object having a curvature; a computer system adapted to: receive a three-dimensional predetermined image, create a holographic interference pattern created according to the three-dimensional predetermined image and the curvature wherein the holographic interference pattern is applied to the object, project a three-dimensional resulting image projected on a planar surface in response to the holographic interference pattern being illuminated wherein the computer system receives the three-dimensional resulting image, create validation information according to a comparison of the three-dimensional predetermined image and the three-dimensional resulting image.

20 Claims, 6 Drawing Sheets

500

600           610

TAGGING AND AUTHENTICATION OF ARTICLES USING A HOLOGRAPHIC INTERFERENCE PATTERN

RELATED APPLICATION INFORMATION

This application is a continuation in part of application Ser. No. 18/176,269, filed on Feb. 28, 2023, which in turn claims priority to Application No. 63/314,533, filed on Feb. 28, 2022. The disclosures of Application No. 63/314,533 are incorporated herein by reference as if fully repeated herein.

FEDERAL CONTRACT NOTIFICATION

This invention was made with government support under SBIR Contract 2111844 awarded by the National Science Foundation. The government has certain rights in the invention.

BACKGROUND OF THE INVENTION

1) Field of the Invention

This invention is directed to a system and method of uniquely tagging and marking objects to provide for unique identification and verification of the object for purposes of detecting counterfeits.

2) Description of the Related Art

The prevalence of counterfeit documents and/or money is driving the need and adoption of sophisticated anti-counterfeit technologies for ID security and brand protection. Some of the mechanisms employed include 3-D security ribbons, special color changing inks, raised printing and watermarks. While these measures are effective when the bill is being inspected by an individual who can feel and/or manipulate the bill, these mechanisms do not allow for use an automated system that can authenticate and verify the document and/or money at a high rate of speed and without the need for a human to visually inspect, handle or manipulate the document or money being authenticated. Moreover, these mechanisms rely on a Gaussian beam of light which is readily available from both natural and artificial sources. These mechanisms do not allow for the authentication process to be dependent on the type of light source being used to authenticate the document or money in question.

One of the obstacles of using an id tag that reflects a holographic image is that the holographic image is reflected orthogonally back towards the light source. It is, therefore, difficult to use an electronic or mechanical sensor to detect the holographic images for purposes of verification. There have been some attempts to use tags that cause the holographic image to be reflected at an angle (e.g., 20 degrees off set from the light source) so that the holographic image is directed toward a sensor. However, such tags are harder and more expensive to produce and more importantly create a holographic image that is less crisp and more difficult for a stationary sensor to capture and/or analyze.

Accordingly, it is an object of the present invention to enable the efficient covert tagging and tracking of objects that allows authentication at a high rate of speed and/or without the need to handle or manipulate the object in question or the positioning of the sensor that may be used in the process so that the entire process can be automated and generate consistent and reliable results.

It is a further object of the present invention to provide such covert tagging that would enable the use of a structured light source, such as a beam of light having an angular momentum, to authenticate the documents or bills in question and/or to use an electronic reader that can read the tag and/or an image projected from the tag so as to verify the authenticity of the money and/or document in question.

BRIEF SUMMARY OF THE INVENTION

The above objectives are accomplished by providing a system and method for uniquely identifying a surface comprising: providing a substrate; applying to the substrate a holographic interference pattern that is created from a holographic interference pattern and information regarding at least one physical characteristic of the surface where there is an image viewable according to a projection from a light source through the holographic interference pattern. The light can be projected as a first beam of coherent light onto the holographic interference pattern to provide for a first image wherein the first image is recognizable to a viewer. The image can be created when the light passes through the holographic interference pattern as well as the curvature of an object to form a projected image on a planar surface.

When there is a projection of a second beam of light that is not designed to operate with the holographic interference pattern, a projected image may not be recognizable to a viewer indication invalidity. A comparison of the first image or the second image can provide validation when the first image is matched to a known image. A match of the projected image with the first image or the second image when there is a lack of authenticity.

The substrate can be taken from the group consisting of a glass surface, curved surface, sticker, adhesive, plastic, metal, ceramic, and any combination thereof. The substrate can be transparent or opaque. The first image is a reflective image from the substrata Projecting a first beam of coherent light onto the holographic interference pattern to provide for a first image can include projecting the first image according to the holographic interference pattern and a substrate curved surface. The first image can include a sub-image is taken from the group consisting of a logo, bar code, alpha numeric text, QR code, and any combination thereof. The first image can include identification information taken from the group consisting of manufacturer, manufacturing location; product description, manufacturing date, lot, expiry, and any combination thereof.

The system can include a server; a known image digitally stored on a computer readable medium in communications with the server; a holographic interference pattern applied to a substrate wherein the holographic interference pattern is adapted to display a verification image when illuminated with structured light generated by a spiral phase plate; a sensor for receiving the verification image; a set of computer readable instructions included in the server adapted for retrieving the know image, receiving the verification image from the sensor, comparing the known image to the verification image, and displaying a verification indication when the know image and the verification image match. The holographic interference pattern can be encoded with orbital angular momentum.

A system can include an object having a surface; a holographic interference pattern created according to a three-dimensional predetermined image and a physical characteristic of the surface wherein the holographic interference pattern is applied to the object; a three-dimensional resulting image projected on a planar surface in response to the holographic interference pattern being illuminated by a first coherent light source; and, a validation information created according to a comparison of the three-dimensional predetermined image and the three-dimensional resulting image. The system can be computerized so that the functional and operation described herein can be performed by a set of computer readable instructions and hardware combined. The system can include a computerized validation system adapted to receive the three-dimensional predetermined image, receive the three-dimensional resulting image, and create the validation information according to a comparison of the three-dimensional predetermined image and the three-dimensional resulting image. The holographic interference pattern, when applied to the object, can include a first refractive index and a second reflective index and the three-dimensional resulting image can be formed according to the holographic interference pattern, the first refractive index, and the second refractive index. The reflective indexes can be used to define the angles of pillars and the optical properties, reflectiveness, reflectiveness and the like, according to the refractive indexes. For example, if a portion of the holographic interference pattern requires a pillar with a reflective angle of X and the object or substrate that is over or under that portion has a reflective angle of Y, the holographic interference pattern for that portion can be created with a reflective angle of X−Y or X+Y. The holographic interference pattern can be created according to a creation computerized system adapted to create the three-dimensional predetermined image according to the three-dimensional predetermined image, curvature of the object or substrate and reflective or refractive indexers of cooperating surfaces.

An identifier can be applied to the object and can include a predetermined alignment with the holographic interference pattern. A computerized validation system can be adapted to receive an image of the object having the identifier and the holographic interference pattern, determine a position of the identifier in relation to the holographic interference pattern and create an alignment verification information representation that the identifier and holographic interference pattern applied to the object are consistent with the predetermined alignment. The identifier can include information taken from the group consisting of a logo, bar code, alpha numeric text, OR code, manufacturer information, manufacturing location, product description, manufacturing date, lot, expiry, ingredients, contents, and any combination thereof.

A curvature associated with the substrate can be created by affixing the substrate to an object wherein the object include a curved surface. The curve can be convex, concave, planar and any combination thereof. The substrate can be taken from the group consisting of a glass surface, curved surface, sticker, adhesive, plastic, metal, ceramic, and any combination thereof. The holographic interference pattern can be is created according to a reflective property of the substrate, one or more reflective indexes associated with the object or substrate and can include pillars that extend from the curvature in a parallel arrangement.

The holographic interference pattern can be illuminated by a light having an orbital angular momentum to produce a three-dimensional resulting image. The structured light can include an orbital angular momentum according to a spiral phase plate.

BRIEF DESCRIPTION OF THE SEVERAL VIEWS OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION OF THE INVENTION

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Figure 1A:
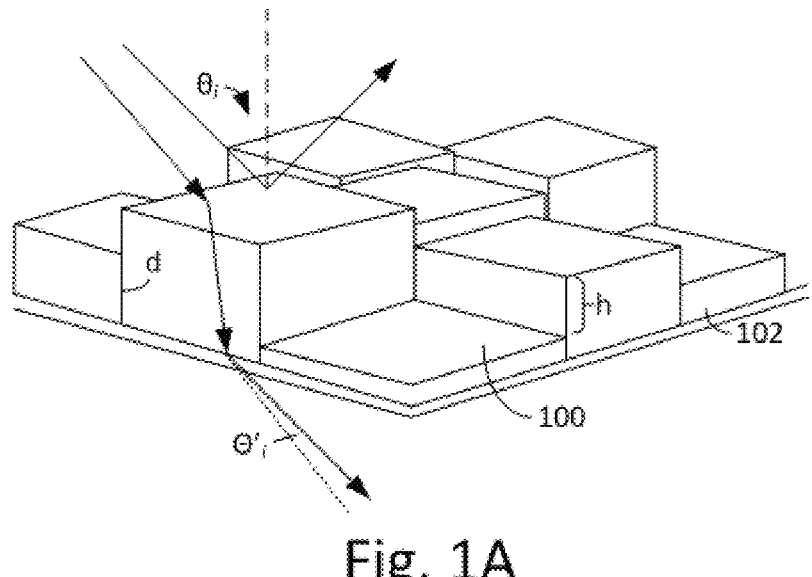
FIG. 1A is a perspective view of a holographic interference pattern, label or imprint according to the present invention.
Figure 1B:
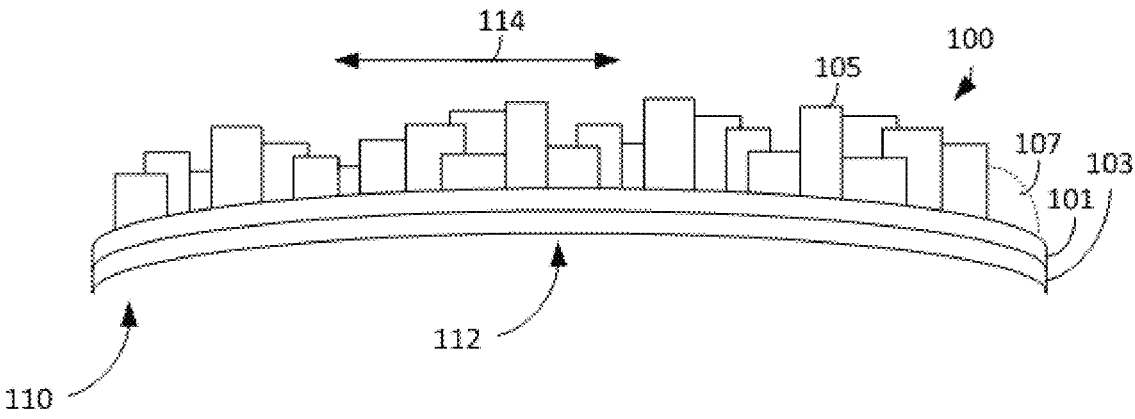
FIG. 1B is a side view of a holographic interference pattern, label or imprint according to the present invention.

Referring to FIGS. 1A and 1B, a holographic interference pattern which includes a computer-generated holographic pattern is shown that can be applied to a surface such as a label applied an object to be verified, which can include documents, money, photographs, artwork, literary works or any other object to which a holographic interference pattern or a label and/or substate including the same may be applied. In one embodiment, a pattern can be applied using laser machining onto a flat or curved surface. The holographic interference pattern 100 can begin with a digital design of a three-dimensional predetermined image that may be printed, stamped, etched, or otherwise transcribed into a given material using known techniques to those skilled in the art. The holographic interference pattern can be a physically recorded interference pattern between the coherent reference beam and the wave scattered by the patterned substrate. The pattern can include one or more pillars that, when light is transmitted through the pillar, the light transverses a distance d through the pillar. One pillar can be adjacent to another pillar so that a first pillar extends above the adjacent pillar by a height h.

The composition of the substrate material, its refractive index, and design of the holographic interference pattern 100 itself can influence the type of interference pattern generated. In some embodiments, the resolution, and spatial features of the holographic interference pattern 100 are impacted by the selected fabrication process. The object that receives the holographic interference pattern can include a surface that has one or more refractive indexes so that the holographic interference pattern is adapted to provide a three-dimensional resulting image when illuminated with coherent light.

The holographic interference pattern 100 can be disposed on a substrate 101. The substrate can be flat, rounded, convex, concave, and any combination thereof. The object receiving the holographic interference pattern can include a surface having one or more of these shapes and can be adapted to produce the three-dimensional resulting image. The three-dimensional resulting image can be compared with the three-dimensional predetermined image that can be used, alone or in combination with the surface features of the object or substrate, to create the holographic interference pattern. The substrate can be flexible so that it can be flat during the manufacturing process and/or during the application process and can be rounded when applied to a rounded surface or when the surface to which it is adhered is flexed, bent, rounded, rolled, radiused, folded, creased or the like. The object or substate can include a first refractive index 110 representing a first curve and a second refractive index 112 representing a second curve. The refractive indexes can be unequal.

An adhesive 103 can be used to secure the substrate to a surface such as a document or money, such as a bill of any increment. The holographic interference pattern can include pillars 105 can include a top surface which can be used for reflecting or refracting light. The pillars can have a varied height. In one embodiment, the pillars are configured to be orthogonal to a plane generally parallel to the substrate when the substrate is flat. When the substrate is applied to a surface, the pillars can be configured to maintain the orthogonal configuration and can include tops portions that are parallel to a plane 114. In one embodiment, the pillars at the edge of the pattern can have an angle defined between a wall of the pillar and the top surface of the substrate so that the angle 107 is greater than 90 degrees. In this configuration, the pillars provide a generally flat surface to interact with light. In one embodiment, the pillars can fan out along the substrate when applied to a rounded surface so that the pillars top surfaces are in an arc. The light and interpretation of the light can account for each of the configurations to produce an image that can represent an authentic article. The three-dimensional predetermined image can be compared with the three-dimensional resulting image and when these images are consistent, it can indicate an authentic object including a container and vial.

The resulting image can be compared with the predetermined images by a computerize system that can include computer readable instructions that, when executed by a processor, are adapted to receive the physical properties of the object, surface, substrate and the like, receive a three-dimensional predetermined image, create a holographic interference pattern according to this information and material received, receive identifying information, and print or otherwise provide a holographic interference pattern on the object or substrate. The computer system can have the three-dimensional resulting image projected upon an input such as a camera so that the computer system can compare the three-dimensional resulting image with the three-dimensional predetermined image, The computer device can also receive the identifier which can be used to retrieve additional information associated with the identifier.

The holographic interference pattern can be disposed on a tag, image area, etched area and the like and can be read by illuminating and probing the holographic interference pattern with a suitable coherent light source. The light source can be of a specific wavelength and can be light that is commonly referred to as laser light. The reconstruction of the far-field image may be mathematically expressed as well as expressing in computer readable instructions (e.g., etching instructions) expressed by the Fresnel-Kirchhoff diffraction equation. In this relation diffraction field, Q(x,y,z), is generated at a distance z from a diffractive optical element, given by:

$$O(z, y, z) = \frac{e^{-ikz}}{i\lambda z} \int \int_x U^i(x'y')G\left((x'y')e^{ik\frac{(x-x')+(y-y')2}{2Z}}dx'dy'\right) \quad \text{(Eq. 1)}$$

where $U^i(x', y')$ is the complex field incident on the holographic plane, $G(x',y')$ is the diffractive optical element transmission function $(x',y')$ and $(x,y)$ are the Cartesian coordinates on the holographic plane and on the image plane respectively, and $k=2\pi/\lambda$ is the incident wave vector, with A as the incident wavelength. By developing the two square terms in the exponential contribution inside the integral in Eq. 1, the following form is provided:

$$O(x, y, z) = \frac{e^{-ikz}}{i\lambda z}e^{ik\frac{(x^2+y^2)}{2z}}FT[A*]\left(\frac{x}{\lambda e'}, \frac{y}{\lambda z}\right) \quad \text{(Eq. 2)}$$

where FT stands for the Fourier Transform operator. The diffraction field O(x,y,z) is related to the Fourier Transform of a modified hologram transmission function A*, calculated at the spatial frequencies(x/λz, x/λz). The transmission function A*is defined as:

$$A*(x', y') = U^i(x', y')G\left((x', y')\exp\left(ik\frac{x'^2+y'^2}{2z}\right)\right) \quad \text{(Eq. 3)}$$

The holographic interference pattern can be a computer-generated schemes and can be designed to be either transmission or reflection depending on the object in which it is place or the substrate and its construction. The holographic interference pattern can be engineered to manipulate either the phase or the amplitude (or both) of the input wave to provide the resulting image. In one embodiment, a control over phase is used. The phase control of the holographic interference pattern can be expressed by its phase function φ(x,y) which for the reflection mode can be described as:

$$\varphi(x, y) = \frac{4\pi}{\lambda} \cos(\theta_i) h(x, y) \qquad \text{(Eq. 4)}$$

$\theta_i$ can be the incident angle if illumination and h(x,y) is the depth of the holographic interference pattern at the coordinates (x,y).

Light that exhibits a helicoidal phase front possess a well-defined orbital angular momentum. These beams can be characterized by a phase term exp(ilφ) where l is the amount of orbital angular momentum carried by each photon in units of h. In one embodiment, an orbital angular momentum beam can be described in terms of Laguerre-Gaussian modes (LG) characterized by two indices l and p, the azimuthal and radial index, respectively. The azimuthal index l can represent the number of intertwined helical wavefronts. The index p represents the number of radial nodes on a plane perpendicular to the direction of propagation and is related to the distribution of intensity pattern in p+1 concentric rings around the central dark zone.

With reference to FIGS. 1A and 1B, the holographic interference pattern can include a pattern that can include a set of subsections 101. Each subsection can include a transmission component, reflective component, color component, height, width, pitch, and the like. The set of subsections can be used to design an image wherein when light is directed to the pattern, the light is reflected and refracted in a manner wherein each subsection can act as a component of the image. In one embodiment, a known image can be used to create the holographic interference pattern where the image can include pixels and each subsection can correspond to a pixel. Therefore, when the proper light is used to illuminate the set of subsections, the resulting image corresponds to the predetermined or known image, but only if the proper light is used. If the resulting image matches the known image, the system and comparison can be used for authentication, validation, and other analysis.

In one embodiment, the holographic interference pattern can be etched in a removable substrate, for example a label or sticker that can be affixed to the surface of an object. If the label is removed or there is an attempt to remove the label, the set of subsections 102 is mechanically modified, and the holographic interference pattern will not produce a reflective or refracted image that matches the known image.

Figure 2A:
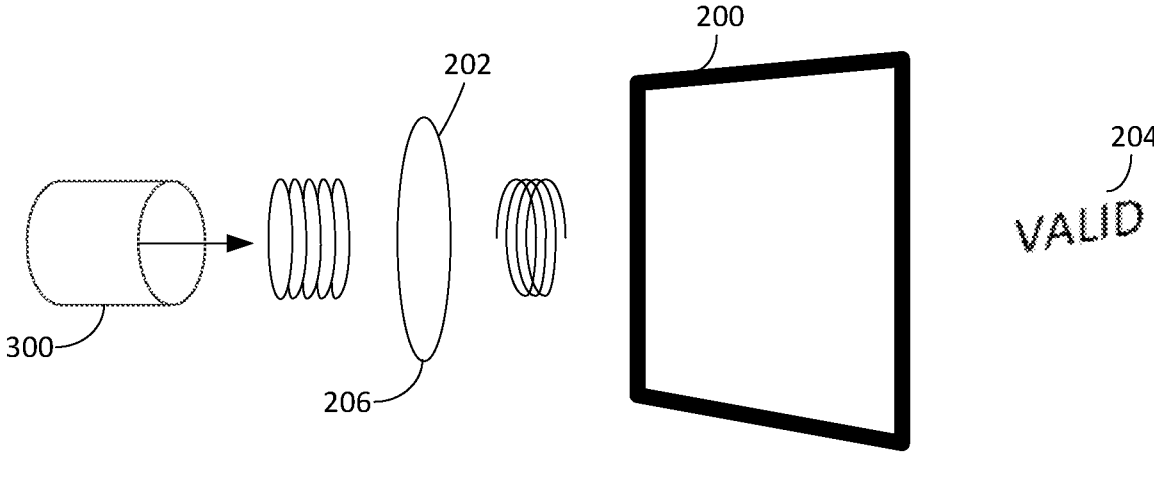
FIGS. 2A and 2B are perspective views of different light structures that can be applied to the holographic interference pattern.
Figure 2B:
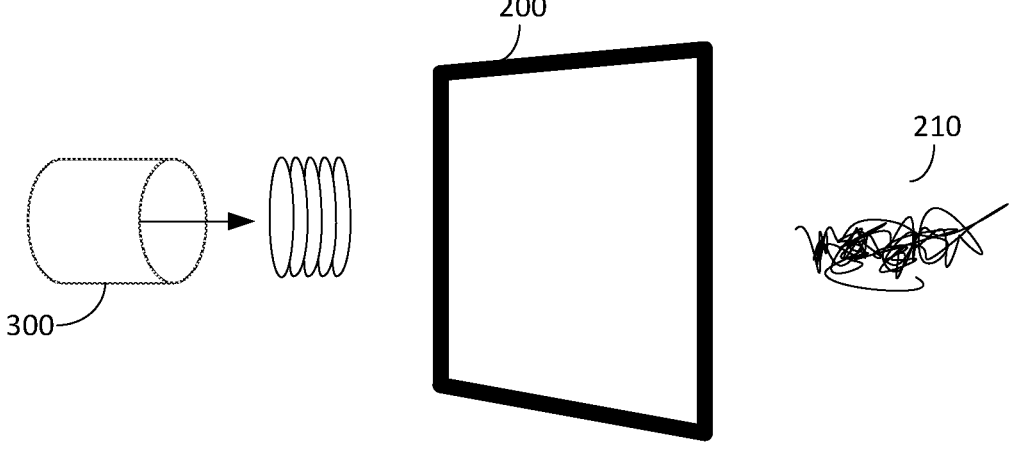

Referring to FIGS. 2A and 2B, a holographic interference pattern 200, which can be computer-generated, can be encoded with a structured light generated by a spiral phase plate 202. The encoded image 204 is viewable through the conversion of a Gaussian beam to a beam 206 that can have an orbital angular momentum 208. In FIG. 2B, the light beam 206 does not pass through the spiral phase plate 202 and the projected encoded image 210 from the holographic interference pattern 200 is unresolved and not recognizable since the incident beam is not encoded with structured light. In FIG. 2A, the unstructured light beam passes through a spiral phase plate 202 where it is converted in to a structure light beam 208 and projected on to the holographic interference pattern 200, thus creating a projected encoded image 204 that is visible and recognizable. In the example shown, the image is a visual representation of text which can be used to verify the authenticity of the holographic interference pattern 204. When the Gaussian beam is used alone, the resulting far field image 210 is not recognizable. Therefore, a unique system and method of identifying a product through the use of a holographic interference pattern and structured light is provided.

In one embodiment, the holographic interference pattern is etched onto a substate that can be included in a tag or label that can be affixed to any object for which an authenticity verification is desired, regardless of the object's physical characteristics including but not limited to the object's size, shape, material, chemical make-up, reflective index, refractive index or the like. The label can be configured so that if it is removed, the holographic interference pattern is physically and mechanically altered so that the image resulting from the projection of light does not match the three-dimensional predetermined image. Therefore, the manipulation, removal or attempted manipulation or removal of a tag, label or the like having the holographic interference pattern from an object can be detected, and therefore actual or potential tampering with the label or object can be detected. An adhesive for securing the substrate to the object or product can be transparent. The holographic interference pattern can also be made according to the transparency of the adhesive and substrate. For example, the reflective index of the substate or adhesive cab be used to determine the holographic interference pattern so that when light passes through or reflects from the holographic interference pattern, the effect of the adhesive and substate are considered. In one example, if the substrate or object is known to bend light at a first angle and the holographic interference pattern has an area that needs to bend light at a second angle, the angle of the holographic interference pattern can be reduced so that the aggregate of the substrate refractive index and that of the holographic interference pattern produce the desired three-dimensional resulting image.

In one embedment, over ninety percent of the light transmitted onto the holographic interference pattern is transmitted through the holographic interference pattern. In one embodiment, less than 5 percent of the light transmitted onto the holographic interference pattern is reflected. In such an embodiment, the holographic interference pattern may be applied to an object that has a transparent surface. In such a case, the beam may pass through the interference pattern and through the transparent surface resulting in a projected or resulting image 306 being displayed on an adjacent surface behind the transparent surface for validation with a visual inspection or via a code reader or other data collection sensor. In other embodiments, over 90 percent of the light transmitted onto the holographic interference pattern is reflected by the holographic interference pattern, the substrate on which the holographic interference pattern is carried and/or the surface of the object on which the holographic interference patterns is carried. In one embodiment, the light may be reflected by the holographic interference pattern. In another embodiment, the light may pass through the holographic interference pattern, where it is reflected by the substrate on which the holographic interference pattern is carried. In another embodiment the object's surface may have a sufficient reflective index that the light may pass through the holographic interference pattern, where it is be reflected by object's surface on which the holographic interference pattern is carried. The holographic interference pattern can be on a side, top or bottom of the object. The surface that carries the holographic interference pattern can be flat, concave, convex or any combination thereof.

The holographic interference pattern can be applied to a substrate so that the holographic interference pattern remains intact when in temperatures in the ranges of −100° C. to 1200° C. or higher. The holographic interference pattern can be applied on a substrate and a protective layer can be provided over the holographic interference pattern. The protective layer can be designed to withstand mechanical, chemical, and environmental stresses preventing the altercation of the holographic interference pattern due to these factors. This protective layer is particularly useful when the holographic interference pattern is affixed to an object that is flexible and subject to being bent, rolled, folded or otherwise manipulated such that the surface may, at various times, be flat, convex and/or concave. The substrate may comprise various materials or surface including, but not limited to, a glass surface, curved surfaces, label/sticker, adhesive, plastic, metal, ceramic, rubber and any combination thereof. In one embodiment, the substrate for the reflective or transmissive holographic interference pattern may be selected from the group consisting of acrylonitrile butadiene styrene (ABS), polylactide (PLA), nylon, acrylic, phenolic, polyester, polyester terephthalate (PET), polyethylene, polypropylene, polycarbonate, polyurethane, polyacetal resin (POM), polyvinyl chloride (PVC), poly(methyl methacrylate) (PMMA), epoxy resin, phenolic resin, polytetrafluoroethylene (PTFE), high density polyethylene (HDPE), silicone, polyurethane, polyvinyl chloride (PVC), silicone rubber, isoprene rubber, thermoplastic elastomers, polyurethane rubbers, and combinations thereof. In one preferred embodiment, the substrate is PET. For transmissive labels, the PET substrate is patterned directly into the PET sheet and an adhesive layer is applied to the opposite side for adhering the PET label to a glass vial or other object.

Figure 3:
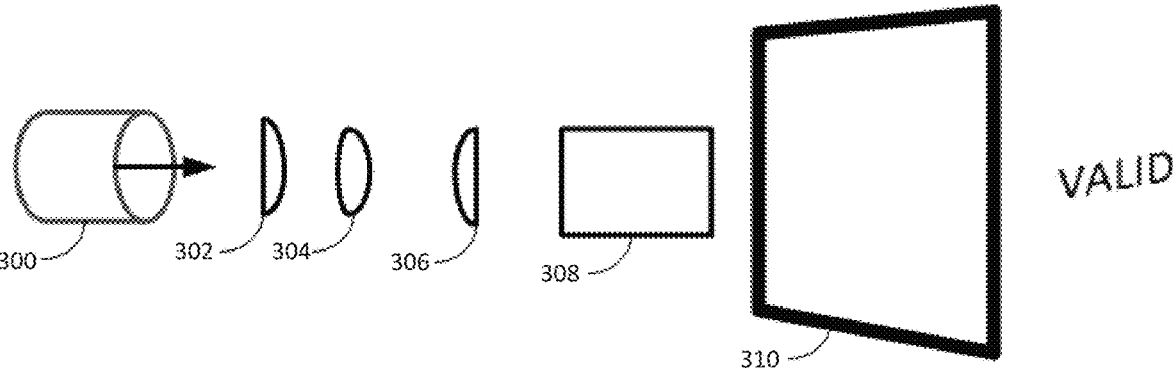
FIG. 3 is a schematic of a structure light lens arrangement applied to a holographic interference pattern, label, substrate, or etching according to the present invention.

Referring to FIG. 3, an example embodiment of a reader for verification, authentication and other analysis of the holographic interference pattern is shown. The reader includes a light source such as a laser 300 that can be converted into structured light, including spiral light, that can be focused or otherwise directed by a first lens 302. The light can pass through a spatial filter 304 (for example, a spiral phase plate 400, FIG. 4) and a second lens 306. In one embodiment, such as where a transmissive holographic interference pattern is used, a beam splitter 308 can be included that allows the light to pass through the beam splitter into the holographic interference pattern 310 and directed to a sensor or other direction, including displaying a visually perceivable indication of validity. In another embodiment that will be discussed more fully in FIG. 7, the beam splitter can also be used to redirect the structured light to a reflective holographic interference pattern, which then projects the three dimensional resulting image on to an adjacent surface for verification. In either case, the three dimensional resulting image can be received by a sensor such as a charged-coupled device that can convert the resulting image into electrical information thereby digitizing the three dimensional resulting image projected and/or reflected from the holographic interference pattern 310. The resulting image can be compared with a predetermined image and if the images match, the holographic interference pattern can be found to be authentic and/or verified.

Figure 4:
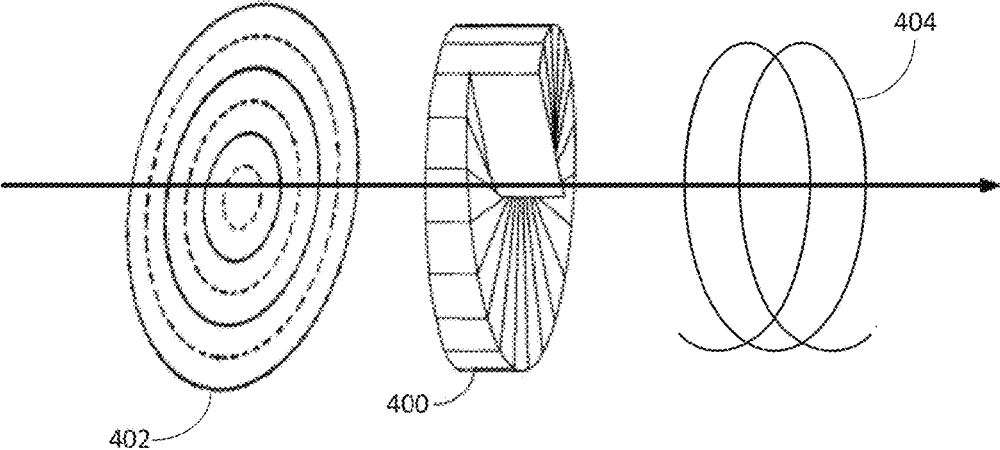
FIG. 4 is a perspective view of a spiral phase plate according to the present invention.

Referring to FIG. 4, in one embodiment, the orbital angular momentum can be generated by using a spiral phase plate 400. A spiral phase plate can appear as a spiral staircase can be adapted to convert a Gaussian beam 402 into an orbital angular momentum beam 404. The spiral phase plate can include transparent optical element with a thickness h that can increase as a function of the azimuthal coordinate according to the following:

$$h(r, \varphi) = \ell \frac{\varphi}{2\pi} \frac{\lambda}{SPP^{-n_0}}. \tag{Eq. 5}$$

where $n_{SPP}$ is the refractive index of the spiral phase plate material, $n_0$ is the refractive index of the surrounding medium, and $\lambda$ is the wavelength of incident radiation. Optimization of both the design and fabrication of high-order orbital angular momentum beams with non-zero radial index may be achieved by introducing radial $\pi$-discontinuities on the spiral phase plate $\Omega_{SPP}$:

$$\Omega_{SPP}(r, \varphi) = \ell_\varphi + \frac{\pi}{2}\left\{1 - \mathrm{sgn}\left[L_p^{|\ell|}\left(\frac{2r^2}{w_0^2}\right)\right]\right\} \tag{Eq. 6}$$

The light that is applied to the holographic interference pattern can be generated so that matching the light with the holographic interference pattern results in a three-dimensional resulting image that matches or is consistent with the three-dimensional predetermined image. Therefore, authentication or validation can be accomplished by a specific computer system and device having this structured light as well as the specifically designed holographic interference pattern.

Figure 5:
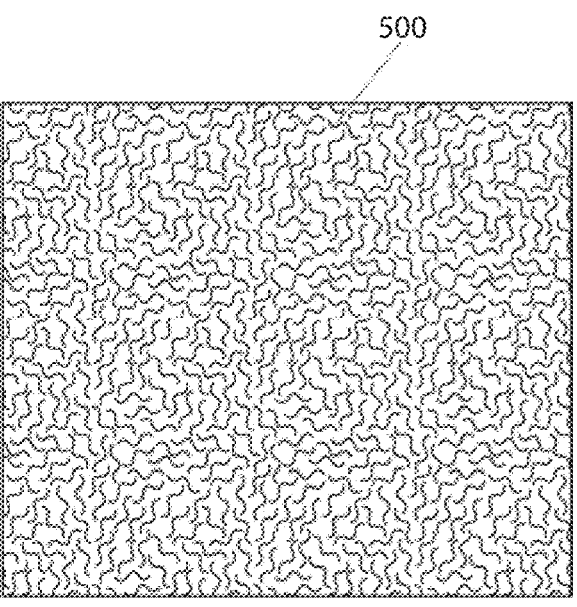
FIG. 5 shows a front view laser microscopy image of a reflective holographic interference pattern according to the present invention.

In one embodiment, the holographic interference pattern can be adapted for reflecting or refracting a particular structure light. The structured light can be produced by projecting light with a known pattern on to a scene. For example, as shown in FIGS. 2 and 5, an incident gaussian light beam may be structured into a spiral, helicoidal phase profile, using a diffractive optical element such as a spiral phase plate. This process generates a beam with orbital angular momentum. By adapting the holographic interference pattern with orbital angular momentum, one may only be able to see, view or detect a meaningful projected image by probing the holographic interference pattern with coherent light of a specific wavelength and by using a specific diffractive optical element that produces structured light with a specific phase.

Figure 6:
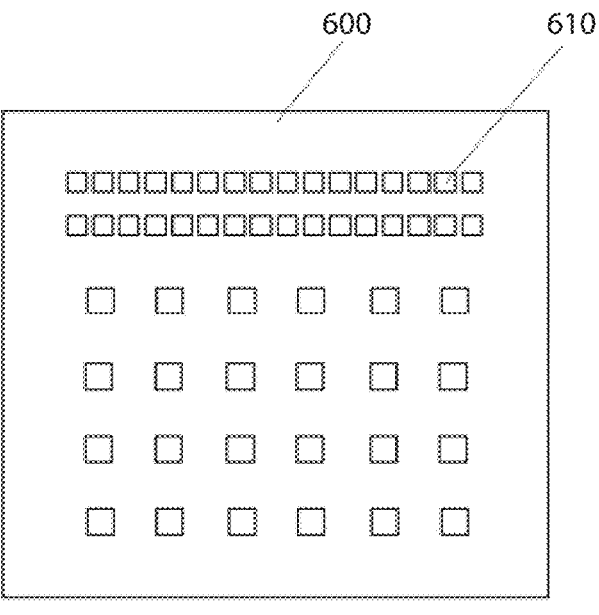
FIG. 6 shows a perspective view of a holographic interference label sheet according to the present invention.
Figure 7:
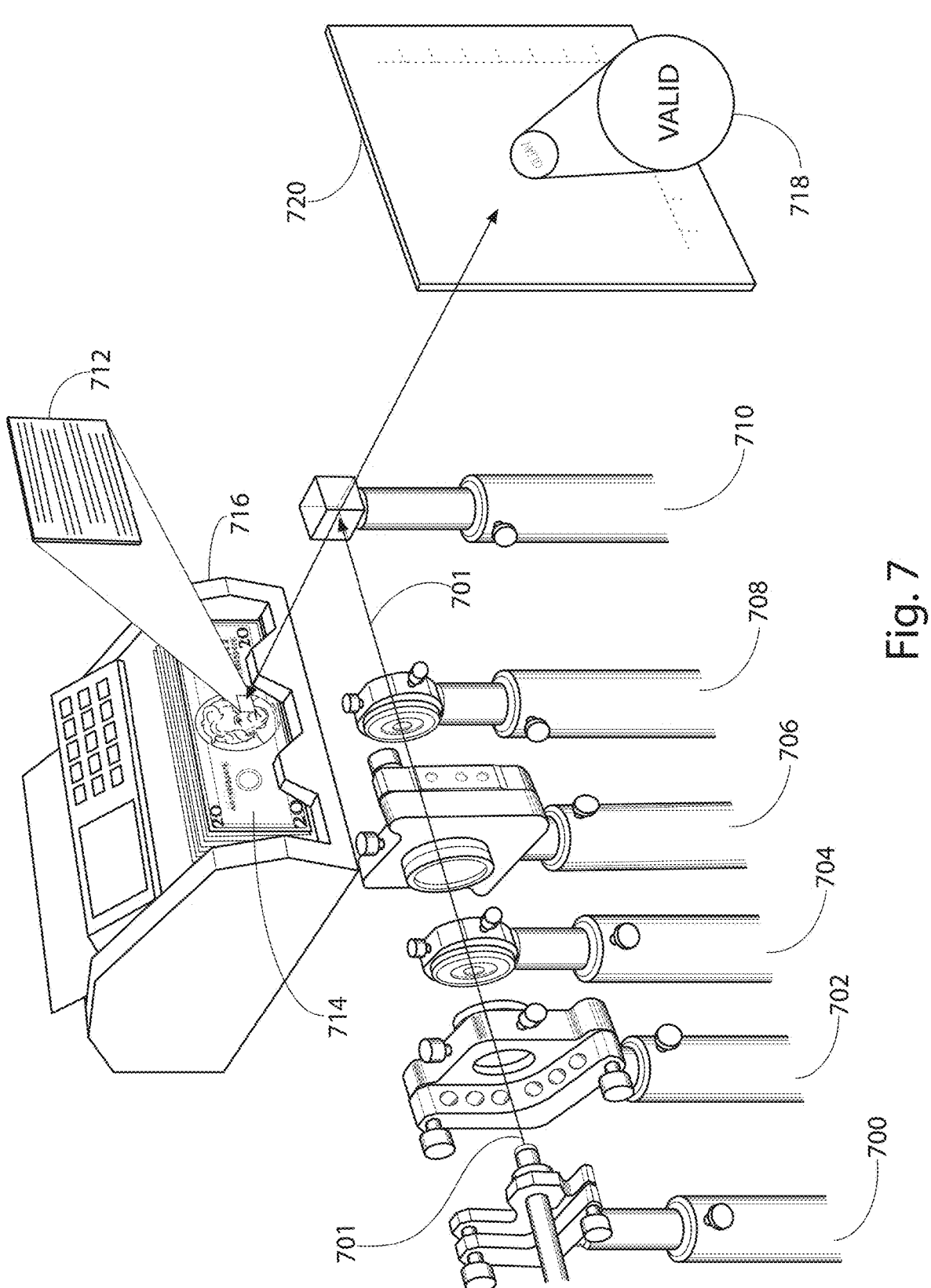
FIG. 7 shows a perspective view of a structure light lens arrangement projecting against and reflective off of a holographic interference pattern or transmit through a holographic interference pattern.

Referring to FIG. 6, a series of holographic interference patterns 610 are shown on a reflective substrate 600. In the example embodiment, substrate 600 is a sheet of PET coated with a layer of silver or other reflective material. With further reference to FIG. 5, a laser microscopy image of the reflective surface 500 of the substrate with a holographic interference pattern is shown. The holographic interference patterns 610 are defined in the reflective coating applied to the sheet of PET. The reflective substrate 600 can include an adhesive backing layer for applying the substrate to an object. The series of holographic interference patterns 610 can be separated and applied to multiple objects. In this example embodiment, reflective substrate 600 reflects light from a structured light source, as shown in FIG. 7, to produce a projected image. When the proper structured light is applied to the holographic interference patterns 610, the light reflected from the reflective surface of the substrate 600 produced the project image for authentication, verification, or to otherwise be analyzed.

Referring to FIG. 7, an example embodiment of a reflective substrate reader for verification, authentication and other analysis of the holographic interference pattern is shown. In the illustrated arrangement, the reader includes a light source such as a laser 700 that can be converted into structured light, including spiral light, that can be focused or otherwise directed by a first plano-convex lens 702. The light is then directed from the first plano-convex lens 702 through a pinhole spatial filter 704. Next, the light is directed from pinhole spatial filter 704 through a second plano-convex lens 706. The light is then directed through a spatial phase plate 708. From spatial phase plate 708 the now structured light passes through a beam splitter 710, which redirects the structure light to the holographic interference pattern 712, which may be applied to an object to be verified 714. In the shown embodiment, the object to be verified 714 is money that is being counted in a money counter 716. In one embodiment, the holographic interference pattern 712 may be carried by a reflective substrate such as a reflective sheet of PET onto which the holographic interference pattern has been adhered, stamped, etched, or otherwise transcribed into the reflective coating applied to the PET substrate, as shown in FIG. 6. The holographic interference pattern can be three dimensional to provide the structure and function herein.

After the light is reflected from the holographic interference pattern 712, a projected image 718 is displayed on an adjacent surface 720 for validation with a visual inspection or via a code reader or other data collection sensor. The projected image can be compared with a known control image and if the images match, the holographic interference pattern can be found to be authentic, verified, or otherwise analyzed.

In one embodiment, the beam splitter 710 changes the direction of the light by an angle that is less than 90 degrees so that the three dimensional resulting image 716 is reflected on to the adjacent surface 720 without having to pass through the beam splitter 710 or the light being transmitted by the laser 700. In another embodiment, the beam splitter 710 changes the direction of the light 701 by an angle that is more than 90 degrees so that the three dimensional resulting image 716 is reflected on to the adjacent surface 720 without having to pass through the beam splitter 710 or the light 701 being transmitted by the laser 700. In yet another embodiment, the beam splitter 710 changes the direction of the light 701 by exactly 90 degrees. In such an embodiment, the resulting three dimensional image 716 that is projected from the holographic interference pattern 712 passes through beam splitter 710. As a result, some of the three dimensional resulting image will be pass through the beam splitter so that it is projected on to the planar surface 718, while some of the resulting image will be directed back towards the laser 700. In such an embodiment, the resulting three dimensional image 176 that is projected from the interference pattern 712 will pass through the light 701 being projected from the laser 700 (and re-directed by the beam splitter). While the interference caused by resulting image 716 passing through the original light 701, the interference pattern 712 may in some instances account for any such interference so that the resulting three dimensional image 716 remains visible, recognizable and/or verifiable by the methods and mechanisms described herein.

Figure 8:
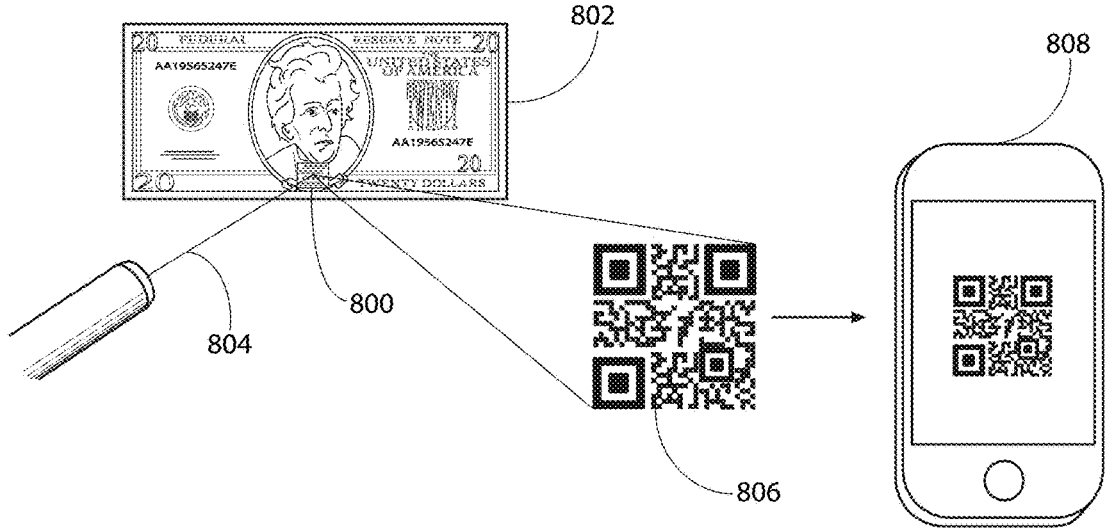
FIG. 8 shows a schematic of a tagging and authentication system according to the present invention.

Referring to FIG. 8, a computer-generated holography authentication process is provided in which a pattern 800 is applied and object to be verified 802, which is probed with a specific frequency of light 804, after which a specific projected image 806 is produced by the pattern that can then be read by a charged coupled device or other data collection sensor 808, for example, a smart phone with a sensor and an authentication application. The smart phone can be adapted to become a holographic interference pattern reader and analyzer. The holographic interference pattern can be a computer-generated holography that can be adapted for providing a covert technology that can reduce and seeks to eliminate counterfeit attempts. The computer-generated holography can be embedded directly into a given object or applied to a label or other material that can be affixed to the object. The computer-generated holography pattern may be invisible to the naked eye or may appear as an aberration on the surface of a given product. However, unless the suitable coherent light source is applied to the pattern, no proper projected resulting image will appear. Once the suitable light source 804 is applied to the holographic interference pattern 800, the projected image 806 can be validated.

The holographic interference pattern can be affixed or attached to the object when it is being manufactured or it can be applied at any time after the manufacturing process has been complete. The process of adding the holographic interference pattern can be performed in a sterile environment process before or after the object is manufactured. In the event that an irregularity was detected serialized labeling can provide for when the irregularity as it can be identified between the unique or serialized information.

Figure 9A:
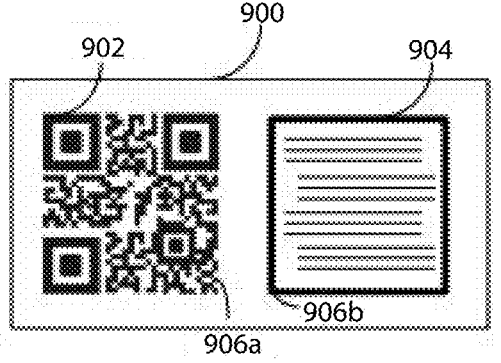
FIGS. 9A and 9B are front views of aspects of a substrate with a holographic interference pattern and identifier.
Figure 9B:
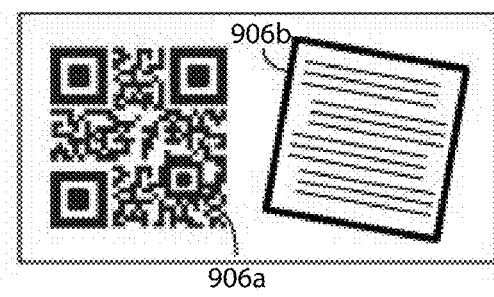

Referring to FIG. 9A, a substrate 900 can be a label with an adhesive that can be affixed to an object. The substrate can include an identifier 902 and holographic interference pattern 904, which can be three dimensional. The identifier and the holographic interference pattern can be aligned on the substrate, for example with parallel inner edges 906a and 906b. The alignment between the identifier and the holographic interference pattern can be predetermined and can be known for a particular substrate. In the event that a scanner or visual observation shows that the actual alignment is not consistent with the predetermined alignment, an indication that the identifier and/or the holographic interference pattern may not be authentic. Referring to FIG. 12B, the identifier and/or the holographic interference pattern are shown out of alignment wherein the inner edges 906a and 906b are not parallel indicating that the identifier, substrate, label, holographic interference pattern and any combination may not be authentic. This verification of alignment can be in conjunction with the verification of the holographic interference pattern. A computer system can have a predetermined, known or control alignment and compare these to the actual alignment as an indicator of the authenticity or vilification of the object.

It is understood that the above descriptions and illustrations are intended to be illustrative and not restrictive. It is to be understood that changes and variations may be made without departing from the spirit or scope of the following claims. Other embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventor did not consider such subject matter to be part of the disclosed inventive subject matter.

It is to be understood that the summary of the invention and the detailed description are of a preferred embodiment and not restrictive of the invention or other alternate embodiments of the invention. While the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from these summaries and certain embodiments described below, and will be readily apparent to those skilled in the art. Such objects, features, benefits, and advantages will be apparent from the above in conjunction with the accompanying examples, data, figures, and all reasonable inferences to be drawn therefrom, alone or with consideration of the references incorporated herein.

What is claimed is:

1. A system for uniquely tagging and verifying authenticity of an article comprising:
    an object having a surface;
    a holographic interference pattern created according to a three-dimensional predetermined image wherein the holographic interference pattern is applied to the surface of the object;
    a three-dimensional resulting image projected on a separate planar surface in response to the holographic interference pattern being illuminated by a first coherent light source; and,
    a validation information created according to a comparison of the three-dimensional predetermined image and the three-dimensional resulting image.

2. The system of claim 1 including a computerized validation system adapted to receive the three-dimensional predetermined image, receive the three-dimensional resulting image, and create the validation information according to the comparison of the three-dimensional predetermined image and the three-dimensional resulting image.

3. The system of claim 1 wherein the holographic interference pattern, when applied to the object, includes a first refractive index and a second refractive index, wherein the three-dimensional resulting image is formed according to the holographic interference pattern, the first refractive index, and the second refractive index.

4. The system of claim 1 wherein the holographic interference pattern is created according to a creation computerized system adapted to create the three-dimensional predetermined image according to the three-dimensional predetermined image and at least one physical characteristic of the surface of the object.

5. The system of claim 1 wherein the three-dimensional resulting image is projected on the planar surface by a beam splitter.

6. The system of claim 5 including a computerized validation system adapted to receive the three-dimensional predetermined image, receive the three-dimensional resulting image, and create the validation information according to the comparison of the three-dimensional predetermined image and the three-dimensional resulting image.

7. The system of claim 5 wherein the beam splitter directs the first coherent light source to the holographic interference pattern and the three-dimensional resulting image is reflected on the planar surface.

8. The system of claim 7 wherein the beam splitter changes a direction of the first coherent light source by less than 90 degrees so that the three-dimensional resulting image is projected from the holographic interference pattern to the planar surface without passing through the beam splitter.

9. The system of claim 1 including an identifier applied to the object and having a predetermined alignment with the holographic interference pattern.

10. The system of claim 9 including a computerized validation system adapted to receive an image of the object having the identifier and the holographic interference pattern, determine a position of the identifier in relation to the holographic interference pattern and create an alignment verification information representation that the identifier and the holographic interference pattern applied to the object are consistent with the predetermined alignment.

11. The system of claim 9 wherein the identifier includes information taken from the group consisting of a logo, bar code, alpha numeric text, QR code, manufacturer information, manufacturing location, product description, manufacturing date, lot, expiry, ingredients, contents, and any combination thereof.

12. The system of claim 1 wherein the holographic interference pattern is affixed to a substrate and the substrate is affixed to the object.

13. The system of claim 12 wherein an identifier is affixed to the substrate.

14. The system of claim 1 wherein the three-dimensional resulting image is recognizable to a viewer when the holographic interference pattern is illuminated by the first coherent light source, and wherein the three-dimensional resulting image is not recognizable to a viewer when the holographic interference pattern is illuminated by a light source that is not designed to operate with the holographic interference pattern.

15. The system of claim 12 wherein the substrate is taken from the group consisting of a glass surface, curved surface, sticker, adhesive, plastic, metal, ceramic, and any combination thereof.

16. The system of claim 12 wherein the holographic interference pattern is created according to a reflective property of the substrate.

17. The system of claim 12 wherein the holographic interference pattern is created according to a reflective index associated with the substrate.

18. The system of claim 1 wherein the holographic interference pattern is illuminated by a light having an orbital angular momentum.

19. A system for uniquely tagging and verifying authenticity of an article comprising:
    an object having a surface;
    a computer system adapted to:
    receive a three-dimensional predetermined image,
    create a holographic interference pattern created according to the three-dimensional predetermined image and at least one physical property of the surface of the object, wherein the holographic interference pattern is applied to the object,
    receive a three-dimensional resulting image that is projected on a separate planar surface in response to the holographic interference pattern being illuminated; and,
    create validation information according to a comparison of the three-dimensional predetermined image and the three-dimensional resulting image, wherein the validation information indicates authenticity when the three-dimensional resulting image matches the three-dimensional predetermined image.

20. A system for uniquely tagging and verifying authenticity of an article comprising:

an object having a holographic interference pattern and identifier disposed on a substrate affixed to a surface of the object;

a three-dimensional predetermined image; and, a computerized system adapted to create the holographic interference pattern according to the three-dimensional predetermined image and a curvature, illuminate the holographic interference pattern with a coherent light source, produce a three-dimensional resulting image projected on a separate planar surface according to an illumination of the holographic interference pattern and create validation information according to a comparison of the three-dimensional predetermined image and the three-dimensional resulting image.

\* \* \* \* \*